United States Patent
Herrema et al.

(10) Patent No.: US 10,381,693 B2
(45) Date of Patent: Aug. 13, 2019

(54) LIQUID LEVEL SENSOR FOR BATTERY MONITORING SYSTEMS

(71) Applicant: Flow-Rite Controls, Ltd., Byron Center, MI (US)

(72) Inventors: Mark Herrema, Rockford, MI (US); Ron D. Earl, Wyoming, MI (US); Scott Kloote, Coopersville, MI (US); Jason L. Fox, Holland, MI (US); Matthew T. Shinew, Ada, MI (US); David A. Moelker, Zeeland, MI (US)

(73) Assignee: FLOW-RITE CONTROLS, LTD., Byron Center, MI (US)

( * ) Notice: Subject to any disclaimer, the term of this patent is extended or adjusted under 35 U.S.C. 154(b) by 170 days.

(21) Appl. No.: 15/079,125

(22) Filed: Mar. 24, 2016

(65) Prior Publication Data
US 2017/0279167 A1 Sep. 28, 2017

(51) Int. Cl.
*H01M 10/48* (2006.01)
*G01F 23/26* (2006.01)

(52) U.S. Cl.
CPC ........ *H01M 10/484* (2013.01); *G01F 23/263* (2013.01); *G01F 23/265* (2013.01); *G01F 23/266* (2013.01); *G01F 23/268* (2013.01); *H01M 10/488* (2013.01)

(58) Field of Classification Search
CPC .... H01M 10/484; G01F 23/26; G01F 23/261; G01F 23/263; G01F 23/265; G01F 23/268
See application file for complete search history.

(56) References Cited

U.S. PATENT DOCUMENTS

| | | | | |
|---|---|---|---|---|
| 4,329,406 A | * | 5/1982 | Dahl | H01M 2/38 320/150 |
| 4,349,882 A | * | 9/1982 | Asmundsson | G01F 23/263 377/19 |
| 5,417,849 A | * | 5/1995 | McEwen | B01D 33/073 210/109 |
| 5,613,399 A | * | 3/1997 | Hannan | G01F 23/265 702/55 |

(Continued)

FOREIGN PATENT DOCUMENTS

| | | |
|---|---|---|
| AU | 2005234650 | 6/2006 |
| EP | 1 889 310 | 8/2010 |

OTHER PUBLICATIONS

International Search Report and Written Opinion of PCT/US16/68880 dated May 4, 2017.

*Primary Examiner* — Justin N Olamit
(74) *Attorney, Agent, or Firm* — Warner Norcross + Judd LLP

(57) ABSTRACT

A liquid level sensor for a liquid electrolyte battery is provided. The liquid level sensor includes a probe having a reference electrode and an electrode array. The electrode array includes a plurality of electrodes that are serially disposed in a lengthwise direction of the probe. The reference electrode is capacitively coupled to each electrode within the electrode array, such that the probe provides a capacitance that varies when the probe is immersed in a liquid level that varies in relation to the probe. The liquid level sensor can alert a user of the need to refill the battery or alert a user of the need to refill the battery in the near future. The liquid level sensor can include a series of LEDs that selectively illuminate to indicate each such condition to the user.

15 Claims, 8 Drawing Sheets

(56) References Cited

U.S. PATENT DOCUMENTS

| | | | |
|---|---|---|---|
| 6,031,354 A | 2/2000 | Wiley et al. | |
| 6,502,461 B2* | 1/2003 | Keller | G01F 23/38 |
| | | | 73/290 R |
| 6,943,566 B2 | 9/2005 | Florin et al. | |
| 8,546,006 B2* | 10/2013 | Beckley | H01M 2/362 |
| | | | 429/50 |
| 8,928,326 B2 | 1/2015 | Jones et al. | |
| 2010/0019773 A1* | 1/2010 | Son | B66F 9/24 |
| | | | 324/431 |
| 2011/0082621 A1 | 4/2011 | Berkobin et al. | |
| 2011/0128154 A1* | 6/2011 | Herrema | G01F 23/0061 |
| | | | 340/636.21 |

\* cited by examiner

LIQUID LEVEL SENSOR FOR BATTERY MONITORING SYSTEMS

FIELD OF THE INVENTION

The present invention relates to a liquid level sensor, and more particularly, a liquid level sensor for liquid electrolyte battery monitoring systems.

BACKGROUND OF THE INVENTION

Liquid electrolyte batteries, including lead-acid batteries, provide electrical energy by means of an electrochemical reaction. The electrochemical reaction involves the reaction of an acid, for example sulfuric acid, with a battery electrode. Recharging of liquid electrolyte batteries is also made possible by an electrochemical reaction, in which water is converted into hydrogen and oxygen. As a result of the recharging reaction and from heat induced water evaporation, however, liquid electrolyte batteries experience a loss of water, and must be refilled with water on a regular basis.

Accordingly, a variety of watering systems have been developed for refilling liquid electrolyte batteries. One such system includes a single point watering system, in which a single source of water is directed to multiple battery cells within the liquid electrolyte battery. Conventional single point watering system include shut-off valves that permanently replace existing venting caps for each battery cell within the liquid electrolyte battery. The shut-off valves automatically terminate the flow of water to the battery cells when the battery cells are substantially full.

Despite the widespread acceptance of existing single point watering systems, watering systems today do not alert users as to when to add water to a battery. Therefore, many different electrolyte level indicators exist in the marketplace. Commonplace electrolyte indicators use a conductive material protruding into a battery cell. The commonplace electrolyte level indicators determine whether or not the probe is contacting electrolyte. The commonplace electrolyte level indicators cannot determine the amount of electrolyte in a cell beyond the point of contact. Therefore, there remains a continued need for improved battery electrolyte level indicators that accurately measure the water level within liquid electrolyte batteries for forklifts, reach trucks, standby power and other applications.

SUMMARY OF THE INVENTION

A liquid level sensor for a battery monitoring system is provided. The liquid level sensor includes a probe having a capacitive sensor. The capacitive sensor provides an output that varies as the liquid level increases in relation to the probe. The liquid level sensor can be used to alert a user of the need to refill the battery or to alert a user of the need to refill the battery in the near future. The liquid level sensor can include a series of LEDs that selectively illuminate to indicate each such condition to the user, for example.

In one embodiment, the capacitive sensor includes an electrode array and a reference electrode. The electrode array includes a plurality of electrodes that are serially disposed in a lengthwise direction of the probe. The reference electrode is capacitively coupled to each electrode within the electrode array, such that the capacitive coupling can vary as the liquid level increases in relation to the probe. The electrode array and the reference electrode are mounted to a common dielectric substrate, for example a printed circuit board. The printed circuit board is overmolded or potted to protect the electrodes against the electrolyte solution within the battery cell.

In another embodiment, the capacitive sensor includes a controller adapted to measure the capacitive coupling between the reference electrode and the electrode array. The output of controller can be used to control the flow of liquid to a battery cell or a plurality of battery cells. For example, a flow device can slow or stop the flow of liquid to a battery cell based on the detected liquid level. The flow device can include a pump in some embodiments, and can include a valve in other embodiments. Further by example, the flow device can include an electric valve mounted to each cell in the battery. The electric valve can close in response to the electrolyte reaching a desired level. The probe can additionally include a thermistor that is electrically coupled to the controller for measuring the temperature of the electrolyte solution within the battery cell.

In another embodiment, a method for measuring a liquid level in a battery is provided. The method includes providing a probe including a reference electrode and an electrode array having a plurality of electrodes that are capacitively coupled to the reference electrode. The method further includes measuring each capacitive coupling, determining the liquid level within a battery cell based on each capacitive coupling. The determined liquid level is shared with a remote server for storage and analysis, and optionally used to control the flow of liquid into the battery cell. Measuring each capacitive coupling can include measuring the capacitance between the reference electrode and each electrode within the electrode array. Determining the liquid level can include detecting a change in capacitance along the lengthwise direction of probe, optionally corresponding to the liquid level within the battery cell.

The present invention can therefore provide an improved liquid level sensor for a liquid electrolyte battery, for example a lead-acid battery. The liquid level sensor can provide real-time liquid level information and temperature information during battery refilling operations, while also monitoring the liquid level within a battery cell or a plurality of battery cells between refills. The liquid level readings and the temperature readings can be communicated wirelessly to an application program hosted on a remote device, for example a smartphone, a tablet, a laptop, or a desktop computer.

These and other features and advantages of the present invention will become apparent from the following description of the invention, when viewed in accordance with the accompanying drawings and appended claims.

DETAILED DESCRIPTION OF THE CURRENT EMBODIMENTS

The invention as contemplated and disclosed herein includes a liquid level sensor for a battery monitoring system. As set forth below, the liquid level sensor includes a probe having a capacitive sensor. The capacitive sensor provides an output that varies as the liquid level increases in relation to the probe, thereby sensing a plurality of non-zero liquid levels. The liquid level sensor can be used in monitoring and alerting users to the electrolyte level, thereby improving battery operation and longevity for liquid electrolyte batteries, including lead-acid batteries.

Figure 1:
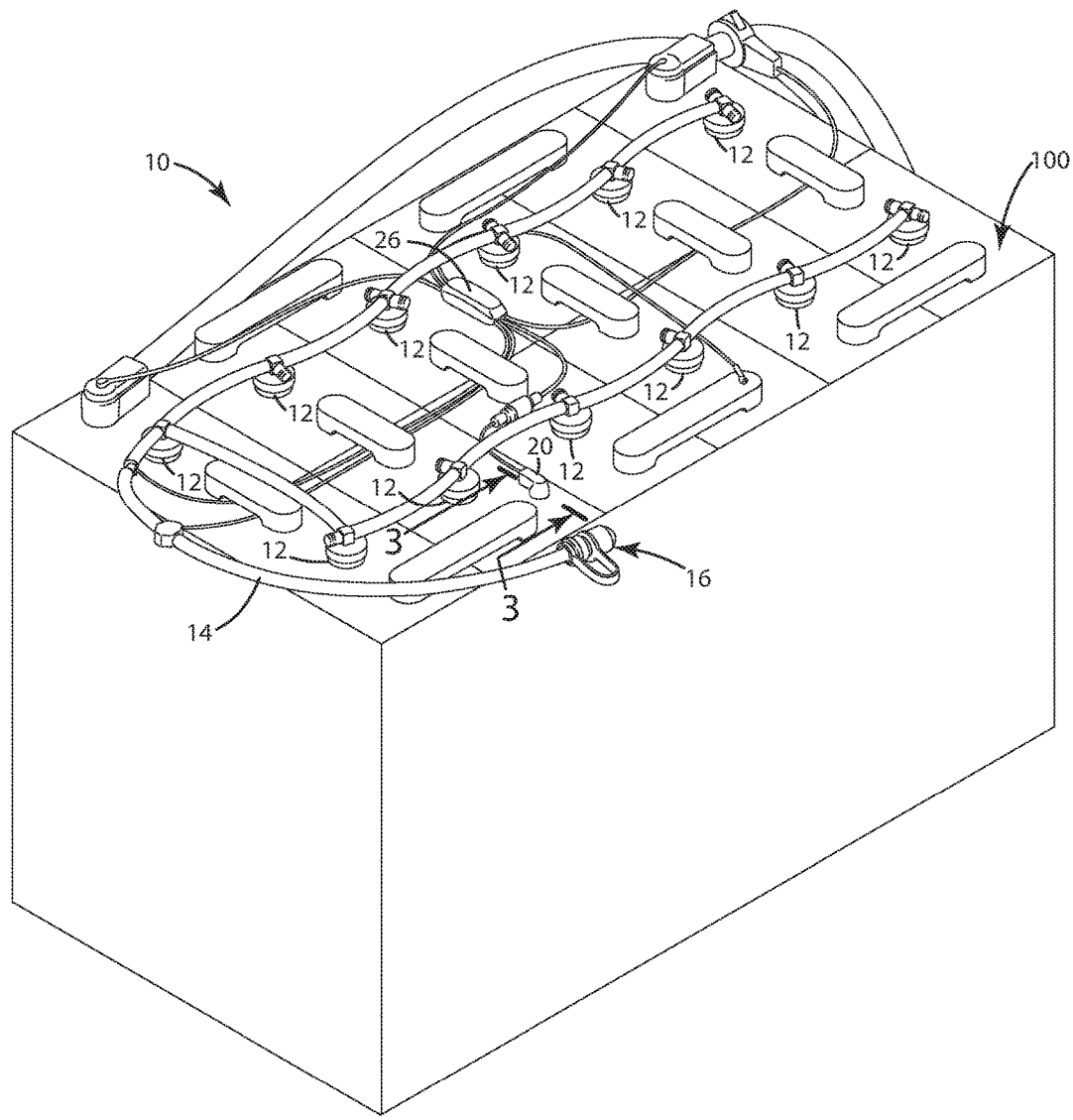
FIG. 1 is a perspective view of a single point watering system including a liquid level sensor in accordance with one embodiment of the invention.

Referring now to FIG. 1, a single point watering system is illustrated and generally designated 10. The single point watering system 10 includes a refill control valve 12 for each battery cell of a lead-acid battery 100. The refill control valves 12 are joined by a section of flexible tubing 14. The flexible tubing 14 provides a fluid flow path for water from an inlet 16 to each of the refill control valves 12. The lead-acid battery 100 also includes a liquid level sensor 20 for at least one of the battery cells. The liquid level sensor 20 generally includes a head portion 22, visible outside of the battery cell, and a probe 24, extending into an opening 18 in the battery cell. In one embodiment, the head portion 22 includes LEDs to indicate the electrolyte liquid level. As discussed in greater detail below, the probe 24 houses a capacitive sensor that provides an output that varies as the liquid level within the battery cell increases or decreases in relation to the probe 24. As also discussed below, the liquid level sensor 20 is in electrical communication with a communications module 26, which may also include LEDs to indicate the electrolyte liquid level. The output of the liquid level sensor 20 is provided to the communications module 26, which in turn outputs the detected liquid level for improved control of battery refilling operations, optionally over a ZigBee network or other wireless network, for example Bluetooth Low Energy (LE) or Wi-Fi.

Figure 2:
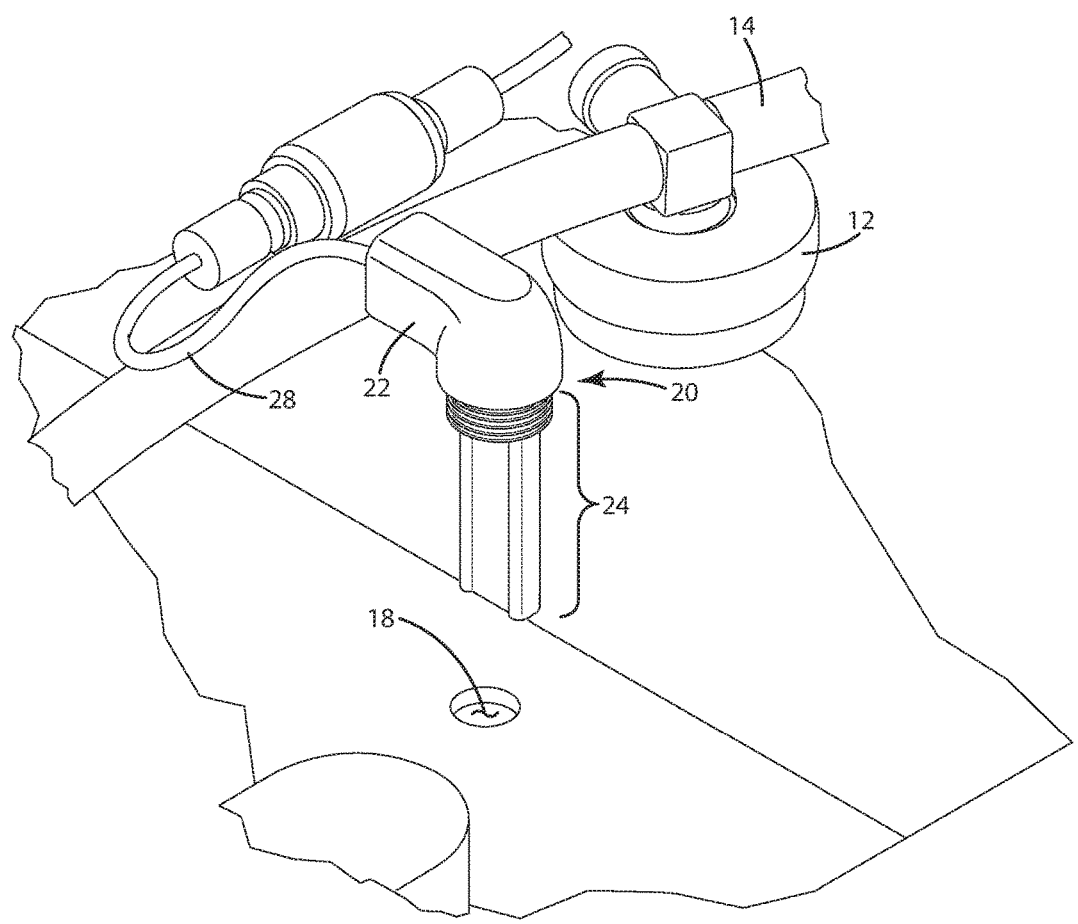
FIG. 2 is a perspective view of a liquid level sensor probe above a battery cell opening for a liquid electrolyte battery.
Figure 3:
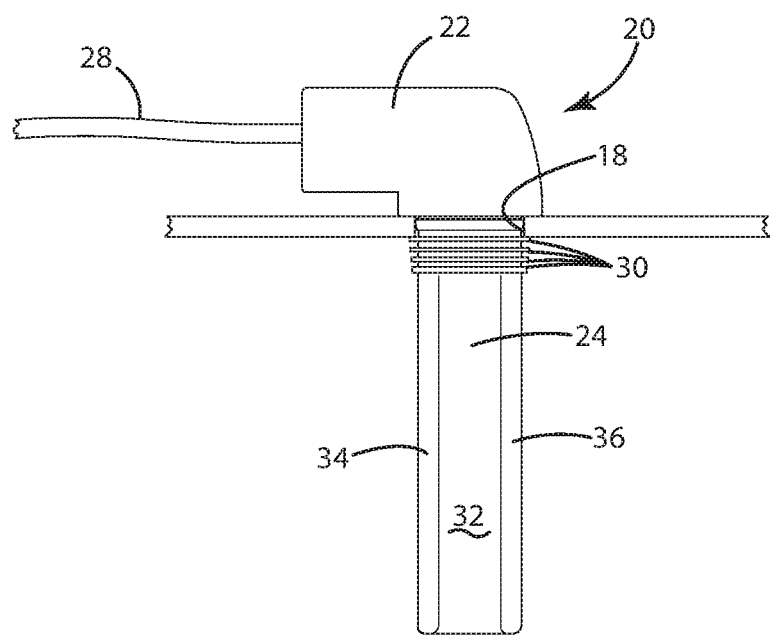
FIG. 3 is a cross-sectional view of the liquid level sensor probe taken along line 3-3 of FIG. 1.
Figure 4:
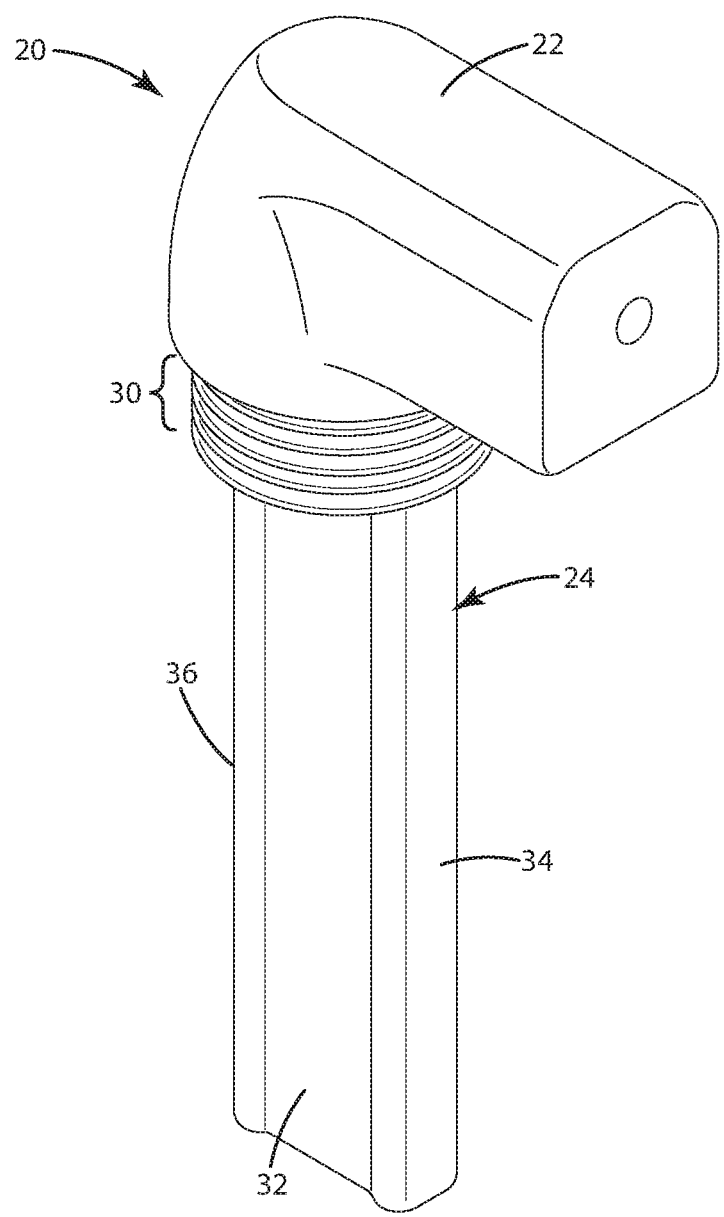
FIG. 4 is a perspective view of the liquid level sensor probe in accordance with an embodiment of the present invention.

The liquid level sensor 20 is further illustrated in FIGS. 2-4. As noted above, the liquid level sensor 20 includes a head portion 22 that is visible from the exterior of the battery cell. The head portion 22 extends at a right angle relative to the probe 24 and includes a data/power cable 28 that extends from the head portion 22 to the communications module 26. The probe 24 extends downwardly from the head portion 22 and includes flexible sealing gaskets 30 to ensure a secure fit within the opening 18 in the battery 100. The sealing gaskets 30 are integrally formed with the probe 24 can include an outer diameter greater than the diameter of the opening 18 to prevent the escape of acid from the battery 100. As shown in FIG. 3, the probe 24 is substantially vertically oriented when seated through the opening 18 in the battery 100, such that the battery liquid level can increase or decrease in relation to the liquid level sensor probe 24. The probe 24 includes a central member 32 and side members 34, 36 that strengthen the probe 24 and protect the central member 32 from damage. The central member 32 and the side members 34, 36 are coextensive in length and include an I-shaped cross-section, such that the width of the central member 32 is orthogonal to the width of the side members 34, 36. As explained below, the central member 32 houses a capacitive liquid level sensor 40 (e.g., within a hermetic seal) for measuring the liquid level within the battery in real time.

Figure 5:
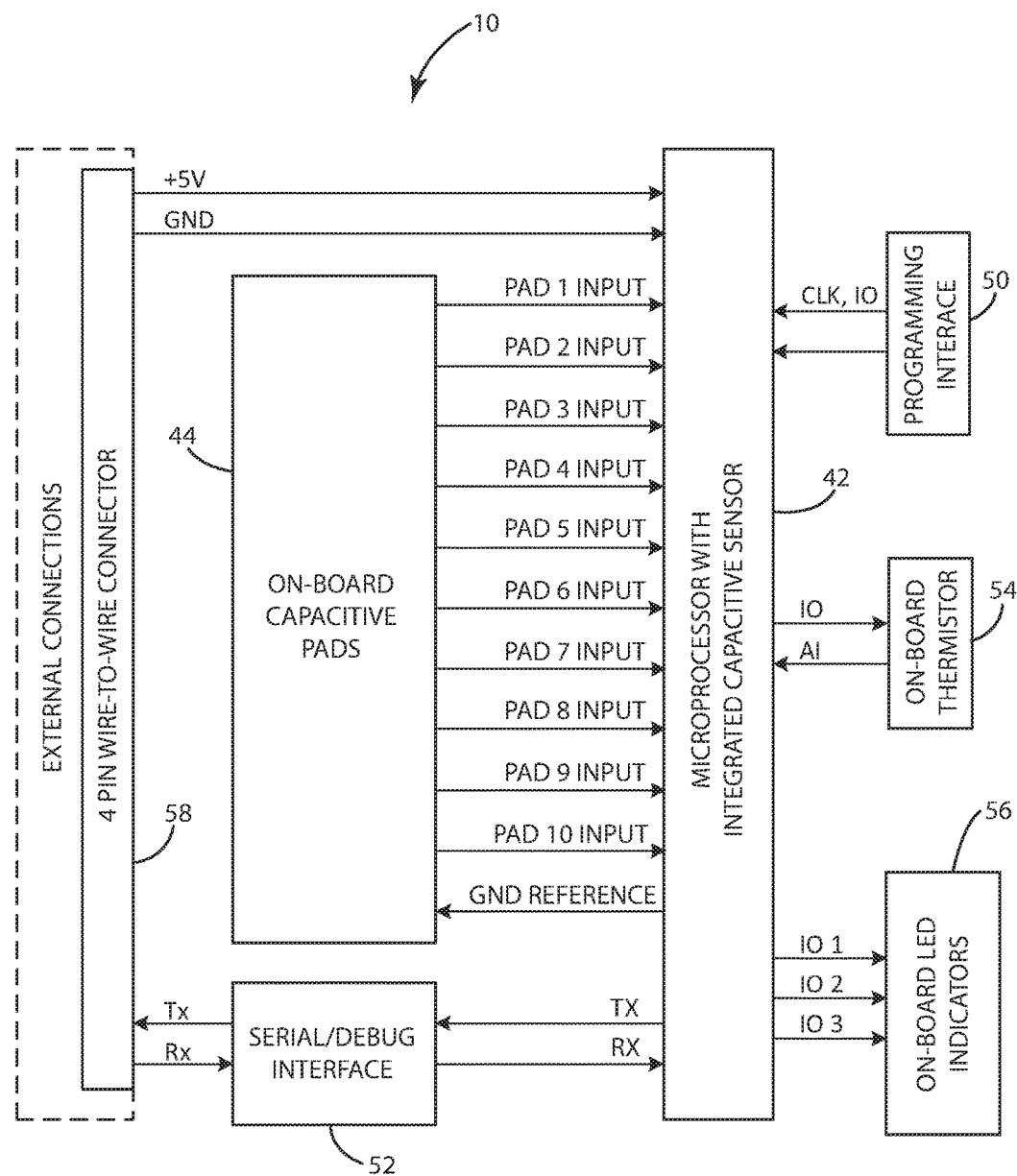
FIG. 5 is a schematic diagram of the liquid level sensor in accordance with an embodiment of the present invention.

Referring now to FIG. 5, a schematic diagram for the liquid level sensor 20 is illustrated. The liquid level sensor 20 includes an internal controller 42 and multiple electrodes 44. The controller 42 is a microcontroller in the present embodiment, but can include an application specific integrated circuit (ASIC) or a field programmable gate array (FPGA) in other embodiments, for example. The electrodes 44 include one or more primary electrode(s) 46 (pad-1 through pad-10) and one or more secondary electrode(s) 48 (a reference electrode). The one or more primary electrode(s) 46 are capacitively coupled to the one or more secondary electrode(s) 48 to define a capacitance therebetween. The presence of a liquid, for example a electrolyte solution, in proximity to the electrodes 44 changes the capacitive coupling between the one or more primary electrode(s) 46 and the one or more secondary electrode(s) 48. This change in capacitance is detected by the microcontroller 42, which correlates the change to a liquid level. The user is then alerted to low liquid levels, optionally via LEDs in one embodiment or via an application program on a smartphone or tablet in other embodiments. In still other embodiments, the liquid level can be used to control the flow of liquid to a battery cell. For example, a flow device can slow or stop the flow of liquid to a battery cell based on the detected liquid level. The flow device can control a pump in some embodiments, and can control a valve in other embodiments. Further by example, the flow device can include an electric valve mounted to each battery cell. The electric valve can close in response to the electrolyte reaching a desired level.

Though the embodiment described above includes a reference electrode 48, in other embodiments the electrodes 44 will not include a reference electrode 48. In these embodiments, the electrodes 44 include only the primary electrodes 46, for example an array of electrodes serially arranged in the lengthwise direction of the probe. The primary electrodes 46 include a self-capacitance that is measured by the controller 42. The controller 42 correlates the self-capacitance of each electrode to the presence or absence of electrolyte, thereby determining the electrolyte liquid level.

Figure 6:
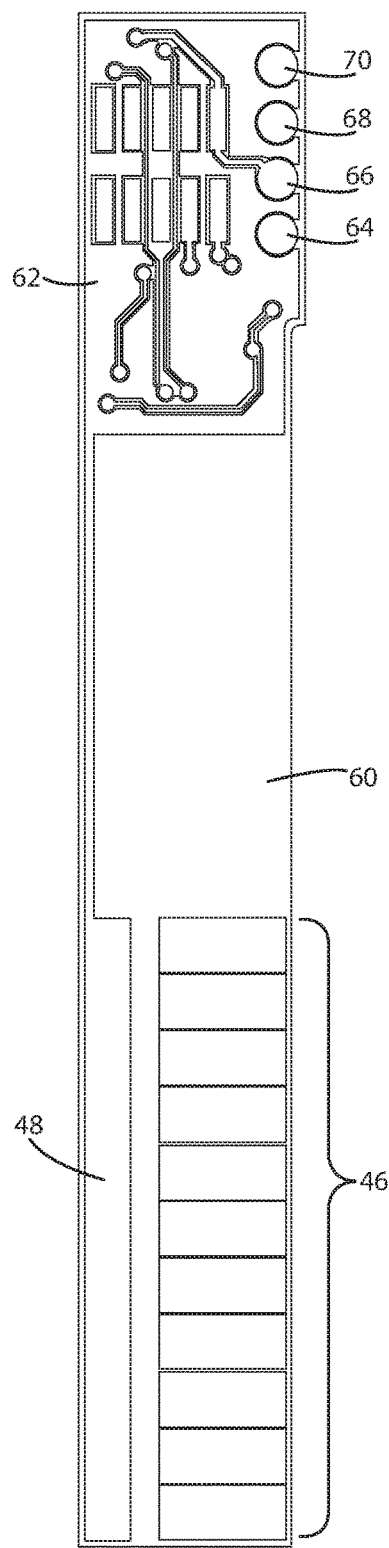
FIG. 6 is a top layer of a capacitive sensor including an electrode array and a reference electrode.

Returning to the embodiment illustrated in FIG. 6, the one or more primary electrode(s) 46 includes an electrode array and the one or more secondary electrode(s) 48 includes a reference electrode. The reference electrode 48 is tied to a reference voltage, for example ground. Each electrode with the electrode array 46 is electrically coupled to the microcontroller 42. Each electrode within the electrode array 46 is capacitively coupled to the reference electrode 48, defining a mutual capacitance therebetween. The presence of a liquid, for example an electrolyte solution, in proximity to an electrode pair causes a change to the mutual capacitance. The change in the mutual capacitance is detected by the microcontroller 42 as a voltage increase relative to when the liquid is not present.

In one embodiment, the microcontroller 42 sequentially strobes each electrode within the electrode array 46 and measures its capacitive coupling to the reference electrode 48. Because the electrolyte solution is electrically capacitive, the presence of the electrolyte solution will cause a change in the capacitive coupling between the electrode array 46 and the reference electrode 48. The portion of the electrode array 46 having a nominal capacitance is determined by the microcontroller 42 to be above the liquid level, and the portion of the electrode array 46 having an increased capacitance is determined by the microcontroller 42 to be below the liquid level. For example, if pad-1 through pad-5 have a nominal capacitance, while pad-6 through pad-10 have a heightened capacitance, the microcontroller 42 can determine the liquid level to be between pad-5 and pad-6. Similarly, if pad-1 through pad-7 have a nominal capacitance, while pad-8 through pad-10 have a heightened capacitance, the microcontroller 42 can determine the liquid level to be between pad-7 and pad-8. Still further by example, if pad-1 through pad-10 have a nominal capacitance, the microcontroller 42 can determine the liquid level to be below pad-10.

The microcontroller 42 can determine the approximate liquid level according to any desired technique. In some embodiments the microcontroller 42 determines the liquid level by comparing each measured capacitance against a threshold capacitance stored to computer readable memory. In other embodiments, the microcontroller 42 determines the liquid level by comparing each measured capacitance against the capacitance at the uppermost electrode, e.g., pad-1. In still other embodiments, the microcontroller 42 determines the liquid level by comparing a change in capacitance over time (e.g., the change in capacitance over successive readings of the same electrode) to a threshold change that is stored to computer readable memory, such that a spike in capacitance corresponds to the presence of a electrolyte solution.

Figure 7:
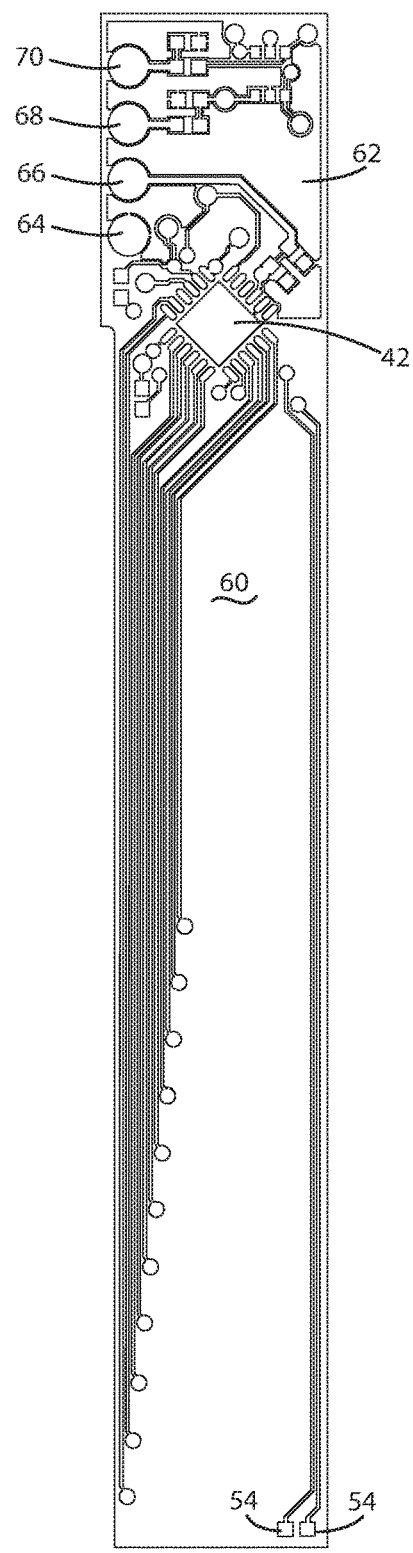
FIG. 7 is a bottom layer of a capacitive sensor including a microcontroller electrically connected to an electrode array and a reference electrode.

Referring again to FIG. 5, the liquid level sensor 20 additionally includes programming interface 50, a serial debugger interface 52, an on-board thermistor 54, on-board indicators 56, and a four-pin wire-to-wire connector 58. The programming interface 50 receives computer readable instructions for carrying out the liquid level measurement described above. The serial debugger interface 52 supports data transfer to verify the liquid level sensor 20 is working properly before packaging and shipment. The on-board thermistor 54 provides a temperature measurement for output to the microcontroller 42. As shown in FIG. 7, the thermistor is 54 is positioned at the lower-most extent of the probe 24 opposite of the reference electrode 48. By measuring the resistance of the thermistor, optionally using a voltage divider, the microcontroller 42 can determine the electrolyte temperature (if the thermistor is below the detected liquid level) or the air temperature (if the thermistor electrode is above the detected liquid level) within the battery 100. The on-board indicators 56 provide immediate feedback regarding the detected liquid level. In some embodiments, the on-board indicators 56 include three LEDs: a steady green LED, a steady red LED, and a flashing red LED. The steady green LED can indicate the liquid level is within an acceptable range. The flashing red LED can indicate the liquid level is below an acceptable range. The steady red LED can indicate the liquid level is above an acceptable range. Though described as being present on the liquid level sensor 20, the on-board indicators 56 can also or alternatively be present elsewhere, for example the communications module 26, a handheld unit, or a desktop unit. Lastly, the wire-to-wire connector 58 includes four pins in the present embodiment, two to the microcontroller (5V and ground) and two to the serial debugger interface 52 (transfer and receive).

Referring now to FIGS. 6-7, the circuit board for the liquid level sensor 20 in accordance with one embodiment is illustrated. More particularly, FIG. 6 depicts a printed circuit board including the electrode array 46 and the reference electrode 48. The electrode array 46 includes multiple array electrodes that are serially disclosed in a lengthwise direction of the probe 24. The array electrodes 46 are formed from copper in the present embodiment and are spaced apart at 0.1" increments. As the term is used herein, an "array" includes two or more elements arranged in an ordered relationship, e.g., a row or a column. Though eleven array electrodes or "capacitive pads" are shown in the present embodiment, greater or fewer array electrodes can be included in other embodiments. Each array electrode is electrically isolated from the remaining array electrodes and from the reference electrode 48. The electrode array 46 is laterally offset from the reference electrode 48 and is coextensive in length with the reference electrode 48. The electrode array 46 and the reference electrode 48 extend along a common lengthwise surface of the probe 24, being mounted to a common dielectric substrate 60. The reference electrode 48 is elongated, having a length substantially greater than its width, and is coupled to the ground plane 62. The four-pin connector 58 is also shown in FIG. 6 including a ground pin 64, a 5V pin 66, and two serial connections 68 and 70. The reverse side of the circuit board is depicted in FIG. 7. In particular, the microcontroller 42 is visible, the microcontroller 42 being electrically connected to each array electrode within the electrode array 46. The thermistor 54 is also visible, being disposed on the lowermost extent of the circuit board. The four-pin connector 58 is also shown in FIG. 7 including a ground pin 64, a 5V pin 66, and two serial pins 68 and 70. The circuit board 60 is typically overmolded or potted within the probe 24 of FIGS. 2-4 to protect the electrodes 44 from corrosion.

Figure 8:
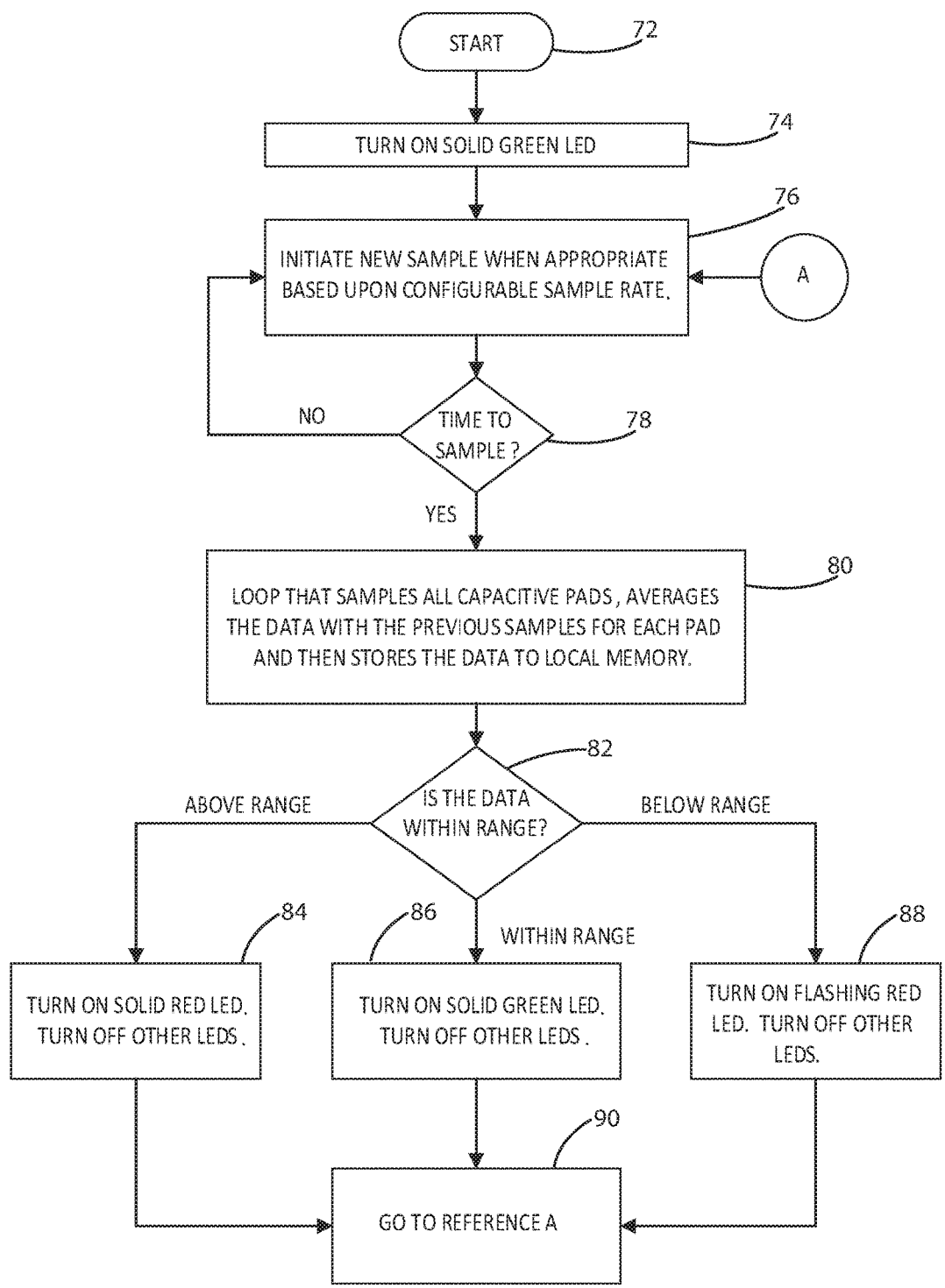
FIG. 8 is a flow diagram illustrating calibration of the liquid level sensor in accordance with an embodiment of the present invention.

Referring now to FIG. 8, a flow diagram illustrates operation of a stand-alone liquid level sensor 20. Upon commencement of an operation algorithm at step 72, the steady green LED is illuminated at step 74. At step 76, the microcontroller 42 initiates a new sample by reading the capacitance at each array electrode 46 and storing the measured values to computer readable memory. At decision step 78, the microcontroller 42 either re-samples or continues to step 80. At step 80, the microcontroller 42 averages the measured values for each array electrode 46 and stores the average to computer readable memory. At decision step 82, the microcontroller 42 compares the average for each array electrode with a predetermined range that is stored to computer readable memory. If the average for any one of the array electrodes is above the predetermined range, the microcontroller illuminates the steady red LED and turns off all other LEDs at step 84. If the average for all of the array electrodes is within the predetermined range, the microcontroller illuminates the steady green LED and turns off all other LEDs at step 86. If the average for any one of the array electrodes is below the predetermined range, the microcontroller illuminates the flashing red LED and turns off all other LEDs at step 88. At step 90, the microcontroller 42 initiates a new sample when appropriate and based on the configurable sample rate.

Figure 9:
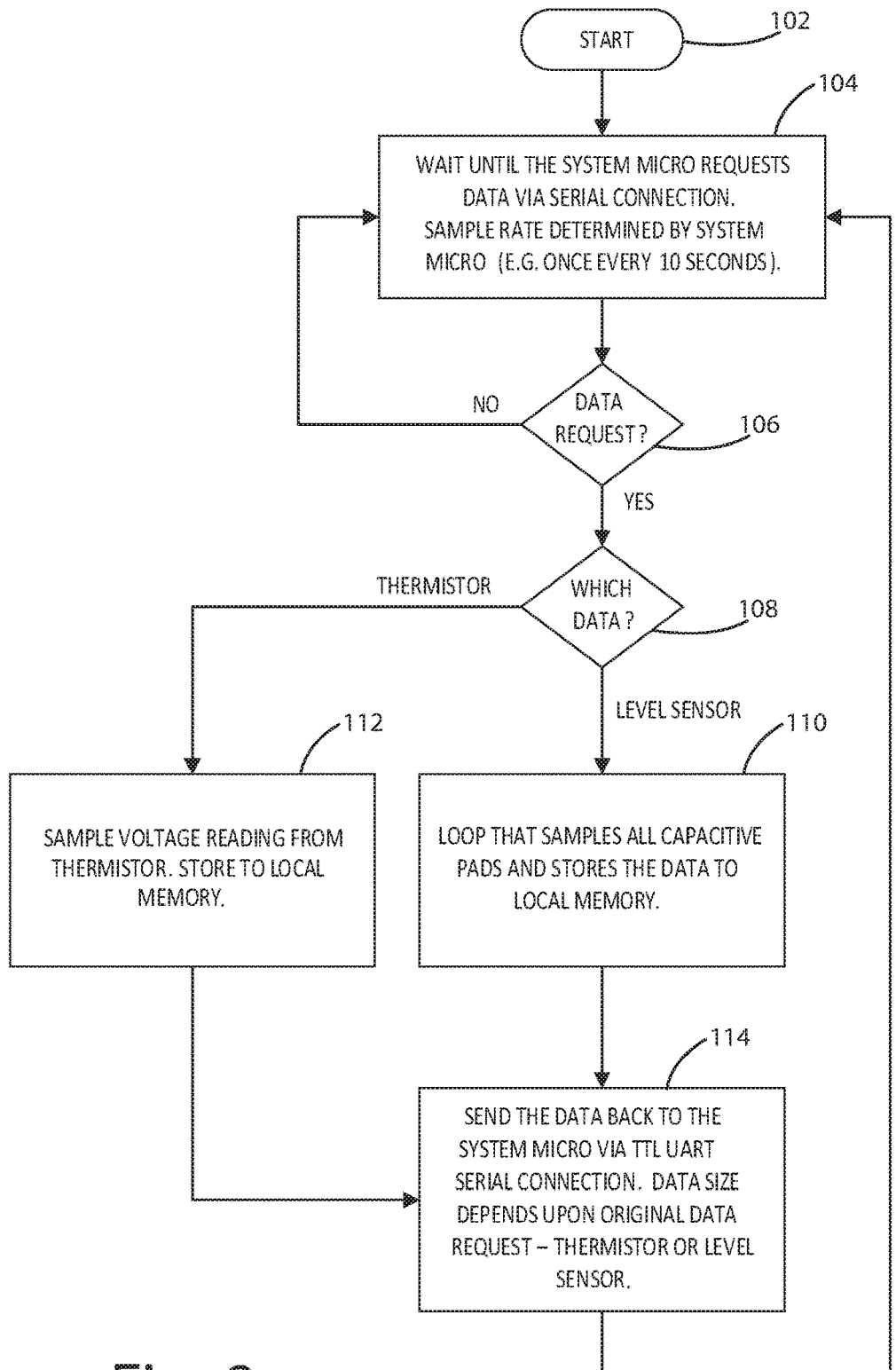
FIG. 9 is a flow diagram illustrating operation of the liquid level sensor in accordance with an embodiment of the present invention.

Referring now to FIG. 9, a flow diagram illustrates operation of the liquid level sensor system. After commencement of a measurement algorithm at step 102, the microcontroller 42 waits until a system controller ("system micro") requests data via the serial connection 52 at step 104. The sample rate can be determined by the microcontroller 42, optionally once every 10 seconds. At decision step 106, the microcontroller 42 determines if data has been requested by the system micro. If data has not been requested, the microcontroller 42 waits for another sample period (e.g., 10 seconds). If data has been requested, the microcontroller 42 determines if the data is the liquid level data or the temperature data at decision step 108. If liquid level data is requested, the microcontroller 42 samples all array electrodes 46 (or capacitive pads) and stores the data to memory at step 110. If temperature data is requested, the microcontroller 42 samples the voltage reading from the thermistor 54 at step 112, optionally via a voltage divider. At step 114, the microcontroller 42 sends the measured data to the system micro via the serial connection 52, optionally using the communications module 26. The size of the data packet can depend on the original data request, e.g., liquid level or temperature or both liquid level and temperature. The system micro can be hosted on a remote device, for example a smartphone, a tablet, a laptop, or a desktop computer.

To reiterate, the embodiments discussed above provide a liquid level sensor for a battery monitoring system and a corresponding method of operation. The liquid level sensor remains permanently affixed to the battery 100 in the present embodiment, but can be removed between refilling operations in other embodiments. The method of operation generally includes measuring the capacitance between the reference electrode 48 and each array electrode, i.e., each electrode within the electrode array 46, and determining the liquid level within the battery 100 based on the capacitance measurements. The method can additionally include communicating the detected liquid level to a remote device, for example a handheld unit or a desktop unit, via the communications module 26. Communication of the detected liquid level is set forth in U.S. application Ser. No. 15/079,124 entitled "Intelligent Monitoring Systems for Liquid Electrolyte Batteries," filed on even date herewith, the contents of which are incorporated by reference in their entirety. The communications module 26 can communicate with the remote device over a ZigBee network or other wireless network, for example Bluetooth, Bluetooth Smart (BLE), or Wi-Fi. The communications module 26 can additionally communicate temperature data to the remote device in accordance with the flow diagram of FIG. 9. During refilling operations, the method of the present embodiments can additionally include controlling the flow of water to the battery cell in response to the liquid level measurements. For example, a flow device, optionally a pump or a valve, can slow or stop the flow of water to the battery 100 based on the determined liquid level within the battery 100. Further by example the flow device can initiate or increase the flow of water to the battery 100 based on the determined liquid level within the battery 100. The liquid level readings and the temperature readings can also be communicated wirelessly by the communications module 26 to an application program hosted on a smartphone, a tablet, a laptop, or a desktop computer. The liquid level sensor 20 can provide real-time information during battery refilling operations, while also ensuring the appropriate liquid level within each battery cell is maintained between battery refilling operations.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A battery electrolyte level monitoring system for a battery having a plurality of cells containing liquid electrolyte, the system comprising:
   a probe for insertion into one cell of the plurality of cells of the liquid electrolyte battery, the probe including:
      a reference electrode, and
      an electrode array including a plurality of array electrodes arranged in a lengthwise direction of the probe, wherein the reference electrode is capacitively coupled to each array electrode; and
   a controller electrically coupled to the electrode array, the controller being adapted to:
   for each array electrode, determine a measured value of a capacitive coupling between the reference electrode and the array electrode,
   store the measured value for each array electrode,
   determine an average value of measured values for each array electrode over time,
   store the average value for each array electrode,
   compare the average value for each array electrode with a predetermined range corresponding to an acceptable range of the level of the liquid electrolyte within the one cell of the liquid electrolyte battery, and
   provide a first output if any one of the average values for the array electrodes is above the predetermined range, a second output if all of the average values for the array electrodes are within the predetermined range, and a third output if any one of the average values for the array electrodes below the predetermined acceptable range, the first, second, and third outputs being different from one another.

2. The system of claim 1 wherein the electrode array is laterally offset from the reference electrode and coextensive in length with the reference electrode.

3. The system of claim 1 wherein the probe further includes a temperature sensor on an end portion of the probe.

4. The system of claim 1 further including first, second, and third on-board indicators providing the first, second, and third outputs respectively.

5. The system of claim 1 wherein the controller includes a communications module operable to transmit the first, second, and third outputs.

6. The system of claim 1 further including a battery watering system responsive to the controller and operable to control the flow of water into the liquid electrolyte battery.

7. The sensing system of claim 6 wherein the battery watering system includes a pump or a valve.

8. The system of claim 1 wherein the controller comprises a microcontroller, an application specific integrated circuit, or a field programmable gate array.

9. A battery electrolyte level monitoring method for measuring a liquid level within a cell of a liquid electrolyte battery, the method comprising:
   providing a probe including a reference electrode and an electrode array having a plurality of array electrodes arranged in a lengthwise direction of the probe;
   for each array electrode, determining a measured value of a capacitive coupling between the reference electrode and the array electrode;
   storing the measured value for each array electrode;
   determining an average value for each array electrode over time;
   storing the average value for each array electrode;

comparing the average value for each array electrode with a predetermined range corresponding to an acceptable range of the level of the liquid electrolyte within the cell of the battery; and providing a first output in response to any one of the average values for the array electrodes being above the predetermined range, a second output in response to all of the average values for the array electrodes being within the predetermined range, and a third output in response to any one of the average values for the array electrodes being below the predetermined range, the first, second, and third outputs being different from one another.

10. The method according to claim 9 further including communicating the first, second, and third outputs to a remote device.

11. The method according to claim 10 wherein said step of communicating is performed over a wireless network.

12. The method according to claim 9 further including controlling the flow of a liquid into the battery cell based on the first, second, and third outputs.

13. The method according to claim 12 wherein controlling the flow of a liquid into the battery cell includes controlling a pump or controlling a valve.

14. The method according to claim 9 wherein the electrode array is adjacent the reference electrode.

15. The method according to claim 9 wherein the reference electrode and the electrode array extend along a common lengthwise surface of the probe.

\* \* \* \* \*

UNITED STATES PATENT AND TRADEMARK OFFICE
CERTIFICATE OF CORRECTION

PATENT NO. : 10,381,693 B2
APPLICATION NO. : 15/079125
DATED : August 13, 2019
INVENTOR(S) : Mark Herrema et al.

Page 1 of 1

It is certified that error appears in the above-identified patent and that said Letters Patent is hereby corrected as shown below:

In the Claims

Column 8, Claim 1, Lines 31-32:
"electrodes below the predetermined acceptable range" should be -- electrodes is below the predetermined range --

Signed and Sealed this
Eighth Day of October, 2019

Andrei Iancu
*Director of the United States Patent and Trademark Office*